Feb. 19, 1957 C. F. SCHOLZ ET AL 2,782,298
VEHICLE LAMP HAVING RESILIENTLY MOUNTED BULB SOCKETS
Filed Dec. 18, 1953 2 Sheets-Sheet 1

INVENTORS
Charles F. Scholz &
BY Spott C. Krausse
J. G. Ross
ATTORNEY

United States Patent Office 2,782,298
Patented Feb. 19, 1957

2,782,298

VEHICLE LAMP HAVING RESILIENTLY MOUNTED BULB SOCKETS

Charles F. Scholz, Maple Heights, and Spott C. Krausse, Bay Village, Ohio, assignors to General Motors Corporation, Detroit, Mich., a corporation of Delaware Application December 18, 1953, Serial No. 399,102

8 Claims. (Cl. 240—90)

This invention relates to a vehicle lamp having resiliently mounted bulb sockets and more particularly to a lamp having an internal vibration and shock suppression mounting for the bulb sockets.

The vehicle art has always been faced with serious problems due to the fact that the vehicle is subjected to shock and vibration, in part due to the medium on which it moves and in part due to the vibrational effects of the propelling power plant. These shock and vibrational forces are transmitted to all parts of the vehicle with more or less crippling effect.

It has always been a difficult problem to so mount a lamp on vehicles such as tractors, tanks, speed boats and on other marine, military and construction equipment as to isolate the bulb filaments and associated wiring from the extreme vibrational stresses to which the vehicle is subjected and at the same time obtain a lamp which was simple, rugged and inexpensive.

Numerous attempts have been made in the past to solve this problem. Such attempts are typified by the use of rubber or rubber-like cushioning members between the vehicle and the lamp casing, reliance being placed on the natural resilience of the member to absorb the vibrations. In most instances, these members were actually bolted to one or more mounting brackets to create a sandwich type resilient mount. However, this expedient has been found to be generally unsatisfactory due to frequent filament failures caused by shear and compression stresses set up in the sandwich mounts and resilient elements. Also, such cushioning members have serious limitations in that their shock absorption characteristics are limited by the relatively high stiffness of the rubber or rubber-like body.

It is therefore an object of our invention to provide a simple, rugged and inexpensive internal vibration and shock suppression mounting adapted to minimize or substantially eliminate bulb filament breakage due to vibrational stress.

It is another object of our invention to provide a resilient bulb socket mounting for isolating the lighting unit from vibrational stresses.

It is another object of our invention to provide a bulb socket assembly resiliently mounted within a lamp casing.

To attain these objects, we mount a resilient isolator member on a support plate having rigid connection with the lamp casing, the socket mounting bracket being fastened to the end of the resilient member. By our invention, we utilize rubber in flexure as distinguished from rubber in shear or compression. By this means, large static deflections required to isolate low frequency vibrations are made possible. Relatively low stiffness in all directions for isolation of vibrations impressed from many sides is also made possible.

Further objects and advantages of the present invention will be apparent from the following description, reference being had to the accompanying drawings, wherein a preferred form of the present invention is clearly shown.

Figure 1:
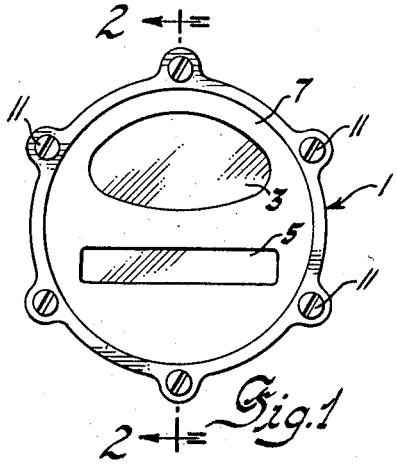
Figure 1 is a front view of the lamp of our invention.
Figure 2:
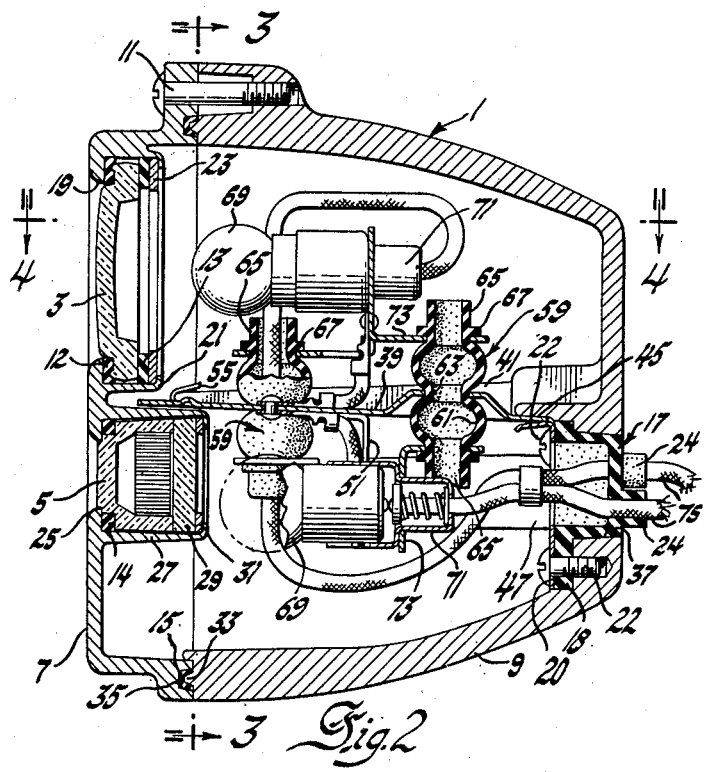
Figure 2 is an enlarged vertical section on line 2—2 of Figure 1.

Referring now to the drawings and more particularly to Figures 1 and 2, there is shown a rear lamp 1 adapted for use on military equipment such as a tank having a red stop and tail service lens 3 and a crystal blackout tail lens 5 positioned in a lamp door 7. Door 7 is removably secured to the open end of a generally cup-shaped lamp casing 9 by means of a plurality of conventional fastening elements such as bolts 11. Door 7 and casing 9 may be made of any suitable material, i. e. aluminum or zinc diecast, molded plastics or sheet metal stampings, and, though no special provision is shown for mounting the lamp casing 9 on the vehicle, it should be understood that this may be accomplished in any suitable manner as by means of a plurality of mounting bolts or studs provided in the rear or side wall of the casing.

Referring now to Figure 2, it is readily seen that lamp 1 has been specially constructed to be completely weather-sealed by means of a plurality of resilient lens sealing gaskets 12, 13 and 14, door gasket 15 and wiring grommet 17. Lens 3 is positioned within opening 19 formed in the face of door 7, a lens frame 21 being provided on the inner surface of the door about the opening. Gaskets 12 and 13 are positioned on the front and rear peripheral surfaces, respectively, of lens 3 and act to seal the lens in the door. Lens 3 is backed up by a clamping washer 23 and the combination of lens, gaskets and washer is clamped in opening 19 by upsetting the end of frame 21 onto washer 23. In a similar fashion, lens 5 is positioned within opening 25 formed in the face of door 7, a lens frame 27 being provided on the inner surface of the door about the opening. Resilient sealing gasket 14 is positioned between the lens and the door and acts to seal the lens in the door. Lens 5 has a trough-like configuration and is knurled on the inner surface of its side walls to prevent wide angle reflection of light therefrom. A red plastic filter 29 and a clamping plate 31 are positioned at the rear of lens 5 and the combination of lens, gasket, filter and plate is clamped in opening 19 by upsetting the end of frame 27 onto plate 31.

Casing 9 is provided with a ring-like forwardly projecting ridge 33 on its front surface. Ridge 33 cooperates with a resilient gasket 15 and a correspondingly shaped groove 35 in the rear surface of door 7 to form an effective weatherseal upon securing the door on the front of the casing.

An opening 37 is provided in the rear wall of casing 9 for admittance of the necessary wiring. A generally cup-shaped resilient grommet 17, having a flange portion 18 formed integral therewith on its inner end, is positioned within opening 37 and is secured to the casing by means of a clamping plate 20 and bolts 22. A plurality of wire sealing bosses 24, corresponding in number to the number of wires passing into the casing, are provided on the outer end of grommet 17 and are so formed as to snugly fit the wires passed therethrough.

Figure 3:
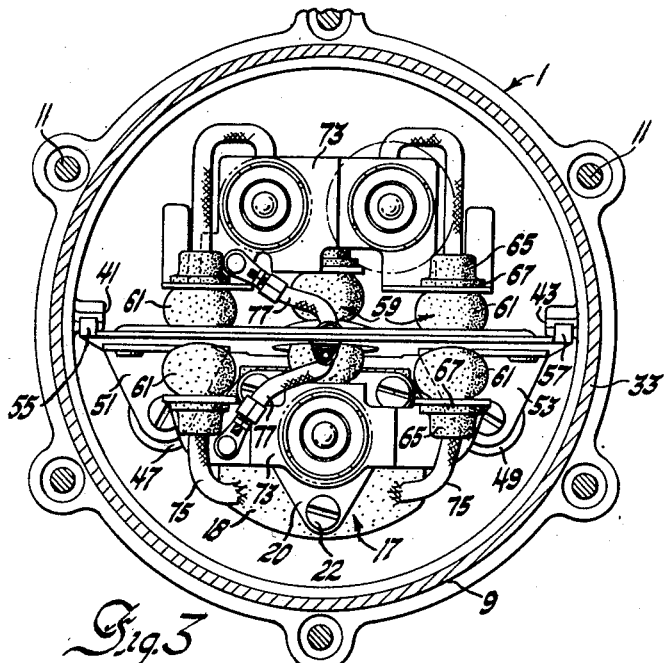
Figure 3 is a front view taken on line 3—3 of Figure 2.
Figure 4:
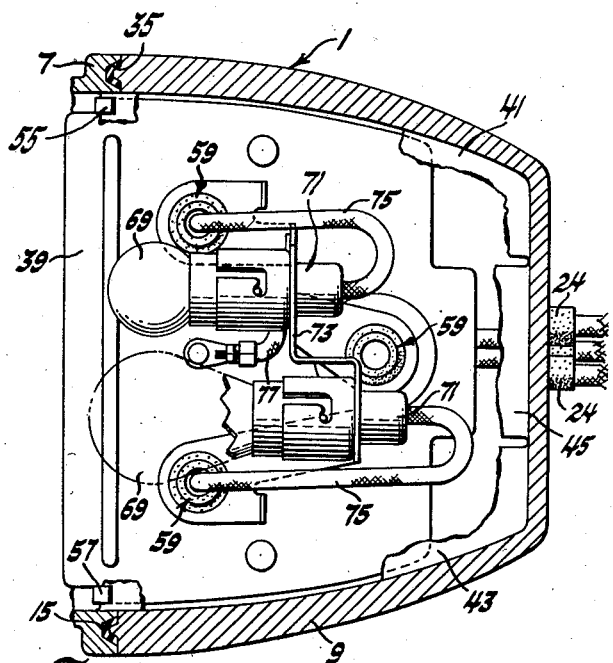
Figure 4 is a sectional view taken on line 4—4 of Figure 2.

Referring now to Figures 2, 3 and 4, there is shown the internal mounting by which we are able to isolate the lamp bulb and socket assemblies from damage due to vibration and shock. Casing 9 is divided internally into an upper and lower compartment containing the service lens 3 and blackout lens 5, respectively, by a metal isolator mounting or support plate 39. Plate 39 is positioned substantially horizontally in the casing and conforms generally to its internal size and shape, the front portion of the plate being positioned between lens frames 21 and 27. In this manner, plate 39 serves both as a support for the bulb and socket assemblies in the lamp compartments and as a baffle for limiting substantially all the light from each bulb to the compartment in which it is located.

Plate 39 is secured within casing 9 by means of a plurality of ribs and bosses formed on the inner wall surfaces of the casing. A pair of inwardly extending and oppositely disposed ribs 41 and 43 are formed on the side wall of the casing and an inwardly extending rib 45 is formed on the rear wall of the casing, the lower surface of each rib being in a common plane. A pair of inwardly extending bosses 47 and 49 are formed on the lower portion of the rear wall and serve as the main support for the baffle plate 39. A pair of baffle support brackets 51 and 53 are rigidly secured in any suitable manner to the lower surface of plate 39 which is supported within casing 9 by bolting or otherwise securing the brackets to bosses 47 and 49, respectively. The upper side and rear surface of plate 39 abuts the lower surfaces of ribs 41, 43 and 45, the plate being thus light-sealed and firmly secured within the casing 9. To further assure the firm attachment of plate 39 within the casing and thus preclude any rattling of the plate against the casing walls, tangs 55 and 57 formed on the front side edges of the plate are bent back over ribs 41 and 43, respectively.

Plate 39 is provided with a plurality of spaced-apart circular openings in each of which is positioned a generally dumbbell shaped tubular isolator member 59 made of suitable resilient material such as rubber or rubber-like plastics. Isolators 59 are formed with upper and lower bulbar portions 61 interconnected by a narrow cylindrical portion 63. A similar narrow portion 65 is formed on each end of members 59 with a flange 67 extending laterally therefrom adjacent the bulbar portions 61. Members 59 are assembled with plate 39 by pulling a flange 67 and adjacent bulb portion 61 through the opening in the plate to position narrow portion 63 therein.

As shown on the drawings, three isolators, spaced apart triangularly, are used to support the bulb and socket assemblies in the upper and lower compartments. It should be understood that one or more isolator units may be used with equal effectiveness in a specific lamp. Likewise, though we show a tubular isolator member, it should be understood that we may use a rod-like member of resilient material or a coil spring. Bulbs 69 and sockets 71 are supported in metal plates 73 secured to isolators 59 in both the upper and lower compartments. Plates 73 are suitably formed with generally vertically disposed portions having openings in which bulb sockets 71 are adapted to be secured and with generally horizontally disposed portions having openings therein aligned with the narrow ends 65 of the isolators 59 for positioning the socket mounting plates 73 thereon between the flanges 67 and adjacent bulbar portions 61.

As shown on the drawings, electrical energy for operating the several lamp bulbs 69 is brought in through a plurality of conductors 75 which pass through resilient bosses 24 in grommet 17 to connect with bulb sockets 71. Where the sockets are located in a compartment other than the one in which grommet 17 is located, the corresponding wires 75 are passed through the tubular isolators 59. Ground connections are made between several socket mounting plates 73 and the casing 9 by means of ground wires 77 connected between plates 73 and baffle plate 39. Socket mounting plates 73 are so proportioned as to locate the bulbs 69 adjacent the respective lens elements 3 and 5.

It can be readily seen from the above description that we have provided a simple and effective internal vibration and shock suppression mounting for use in vehicle lamps. The isolator units 59 are secured to a mounting plate 39 in such a manner as to be subjected to the vertically downward load by the support structure, the load thus applied acting to flex the bulbar portions 61. Vibrations and jars from any direction likewise tend to flex the isolators 59 which then act to absorb and suppress the stresses.

Though we have shown and described our invention as being embodied in a compartmented lamp, the invention is equally as applicable to lamps having single compartments, one or more lamp bulbs, and lamps of varying types, and it should be understood that other forms might be adopted as may come within the scope of the claims which follow.

What is claimed is:

1. An internal vibration and shock suppression mounting for lamp bulbs comprising a main support adapted to be rigidly secured within a lamp casing, a plurality of resilient tubular isolators positioned on said support and extending through and on each side thereof, a socket mounting member secured to the ends of said isolators on each side of said support, and a bulb and bulb socket assembly secured to said member, the weight of said bulb and bulb socket assembly being effective as a vertical load in a direction substantially parallel to the longitudinal axes of said isolators.

2. In a vehicle lamp constructed to isolate the bulb filaments from vibration and shock, the combination of a casing, a door on the open end of said casing, a lens in said door, a plate supported in said casing, means provided on said casing for cooperation with said plate to rigidly position said plate within said casing, a resilient tubular isolator located within said casing and secured to said plate, a socket mounting member secured to the end of said isolator, and a bulb and bulb socket assembly secured to said member, the weight of said bulb and bulb socket assembly being effective as a vertical load in a direction substantially parallel to the longitudinal axis of said isolator.

3. In a vehicle lamp constructed to isolate the bulb filaments from vibration and shock, the combination of a casing, a door on the open end of said casing, a lens in said door, a plate supported in said casing, means provided on the inner surface of said casing for cooperation with said plate to rigidly support said plate within said casing, a plurality of openings in said plate, a resilient tubular isolator positioned in each opening and extending on each side of said plate, a socket mounting member secured to the ends of said isolators positioned on the same side of said plate and a bulb and bulb socket assembly secured to said member, the weight of said bulb and bulb socket assembly being effective as a vertical load in a direction substantially parallel to the longitudinal axes of said isolators.

4. In a vehicle lamp the combination of a casing, a door on the open end of said casing, a plurality of lenses in said door, a plate supported in said casing dividing said casing into separate compartments each containing at least one of said lenses, inwardly extending ribs provided on the inner surface of the side and rear walls of said casing in abutment with the surface of said plate to firmly position said plate and light-seal said compartments, a plurality of resilient isolators positioned on said plate in each compartment, a socket mounting member secured to the ends of said isolators, and at least one bulb and bulb socket assembly secured to said member, the weight of said bulb and bulb socket assembly being effective as a vertical load in a direction substantially parallel to the longitudinal axes of said isolators.

5. In a vehicle lamp the combination of a casing, a door on the open end of said casing, a lens in one portion of said door, a lens in another portion of said door, a plate supported in said casing dividing said casing into separate compartments each containing one of said lenses, inwardly extending ribs provided on the inner surface of the side and rear walls of said casing in abutment with the surface of said plate to firmly position said plate and light-seal said compartments, a plurality of spaced-apart openings in said plate, a resilient isolator positioned in each opening and extending into the respective compartments and a socket mounting member in each compartment secured to the ends of said isolators in both compartments having a generally vertically disposed portion, and a plurality of bulb and bulb socket assemblies secured to said vertically disposed portions, the weight of said bulb and bulb socket assembly being effective as a vertical load in a direction substantially parallel to the longitudinal axes of said isolators.

6. In a vehicle lamp constructed to isolate the bulb filaments from vibration and shock, the combination of a generally cup-shaped casing, a door on the open end of said casing, a lens in the upper portion of said door, a lens in the lower portion of said door, a mounting plate supported in said casing dividing said casing into upper and lower compartments, inwardly extending ribs provided on the inner surface of the side wall and rear walls of said casing in abutment with the surface of said plate to firmly position said plate and light-seal said compartments, a plurality of circular spaced-apart openings in said plate, a resilient tubular isolator positioned in each opening and extending into both of said compartments, a socket mounting plate in each compartment secured to the ends of said isolators in each of the upper and lower compartments and having a generally vertically disposed portion, and a plurality of bulb and bulb socket assemblies secured to said vertically disposed portions, the weight of said bulb and bulb socket assembly being effective as a vertical load in a direction substantially parallel to the longitudinal axes of said isolators.

7. In a vehicle lamp constructed to isolate the bulb filaments from vibration and shock, the combination of a generally cup-shaped casing, a door on the open end of said casing, a service lens in the upper portion of said door, a blackout lens in the lower portion of the door, a mounting plate supported in said casing dividing said casing into upper and lower compartments, inwardly extending ribs provided on the inner surface of the side and rear walls of said casing in abutment with the surface of said plate to firmly position said plate and light-seal said compartments, three circular spaced-apart openings in said plate, a generally dumbbell-shaped resilient tubular isolator positioned in each opening about the narrow portion interconnecting the bulbar portions of said isolator, a socket mounting plate in each compartment secured to the ends of said isolators in each of the upper and lower compartments and having a generally vertically disposed portion, a plurality of bulb and bulb socket assemblies secured to said vertically disposed portions, and a plurality of conducting wires entering said casing and being secured to said bulb sockets, the weight of said bulb and bulb socket assembly being effective as a vertical load in a direction substantially parallel to the longitudinal axes of said isolators.

8. An internal vibration and shock suppression mounting for lamp bulbs comprising a main support plate adapted to be rigidly mounted within a lamp casing, a plurality of generally dumbbell shaped resilient tubular isolators mounted on said support plate with each bulbar portion of each isolator on opposite sides thereof, a socket mounting plate on each side of said support plate, each of said mounting plates being positioned on the ends of said isolators on the respective sides of said support plate, and a bulb and bulb socket assembly secured to each mounting plate, the weight of said assembly being effective as a vertical load in a direction substantially parallel to the longitudinal axes of said isolators.

References Cited in the file of this patent

UNITED STATES PATENTS

| 1,369,389 | Browne | Feb. 22, 1921 |
| 2,208,154 | Daehler | July 16, 1940 |
| 2,332,362 | Bartow | Oct. 19, 1943 |
| 2,368,166 | Sheldrick et al. | Jan. 30, 1945 |
| 2,642,253 | Markowitz | June 16, 1953 |

FOREIGN PATENTS

| 23,388 | Great Britain | 1913 |
| 383,988 | Great Britain | Dec. 1, 1932 |